US006697880B1

(12) United States Patent
Dougherty (10) Patent No.: US 6,697,880 B1
(45) Date of Patent: Feb. 24, 2004

(54) METHODOLOGY AND GRAPHICAL USER INTERFACE FOR BUILDING LOGIC SYNTHESIS COMMAND SCRIPTS USING MICRO-TEMPLATES

(75) Inventor: W. David Dougherty, Round Rock, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/228,347

(22) Filed: Jan. 11, 1999

(51) Int. Cl.[7] ............................................. G06F 9/00
(52) U.S. Cl. .................. 709/320; 345/762; 717/105; 716/18
(58) Field of Search ................. 709/311, 310, 709/328, 320; 345/762–763; 717/100–178; 716/1–12, 18

(56) References Cited

U.S. PATENT DOCUMENTS

| 5,657,438 | A | * | 8/1997 | Wygodny et al. ............... 714/1 |
| 5,675,752 | A | * | 10/1997 | Scott et al. .................. 345/866 |
| 5,854,930 | A | * | 12/1998 | McLain et al. ............. 717/139 |
| 5,862,372 | A | * | 1/1999 | Morris et al. ................ 717/109 |
| 6,002,868 | A | * | 12/1999 | Jenkins et al. .............. 717/105 |
| 6,006,230 | A | * | 12/1999 | Ludwig et al. ............... 707/10 |
| 6,043,815 | A | * | 3/2000 | Simonoff et al. ........... 345/744 |
| 6,046,742 | A | * | 4/2000 | Chari .......................... 345/734 |
| 6,054,983 | A | * | 4/2000 | Simonoff et al. ........... 345/738 |
| 6,182,279 | B1 | * | 1/2001 | Buxton ........................ 717/100 |
| 6,212,674 | B1 | * | 4/2001 | Suckow ...................... 717/109 |
| 6,247,020 | B1 | * | 6/2001 | Minard ..................... 707/104.1 |
| 6,311,320 | B1 | * | 10/2001 | Jibbe ........................... 717/111 |
| 6,321,369 | B1 | * | 11/2001 | Heile et al. .................... 716/11 |
| 6,378,123 | B1 | * | 4/2002 | Dupenloup .................. 716/18 |
| 6,425,116 | B1 | * | 7/2002 | Duboc et al. ................. 716/18 |
| 6,591,272 | B1 | * | 7/2003 | Williams .................... 707/102 |
| 2003/0027561 | A1 | * | 2/2003 | Iyer ........................... 455/418 |

OTHER PUBLICATIONS

Neuron Data, Inc. "Ooscript Language" Technical Paper. Apr. 2, 1996.*
*Design Compiler*, Release 1998.02, Synopsys, Inc., © 1998.
*Silicon Arena User Guide—Project Setup*, Unified Design Automation, Inc., © 1995–98, pp. 1–15, <http:\\www.udai.com/help/ProjectEdit.shtml>(last modified Feb. 12, 1999).
*Silicon Arena User Guide—Synthesizing Designs*, Unified Design Automation, Inc., © 1995–1998, pp. 1–9, <http:\\www.udai.com/help/SynthesizingDesigns.shtml>(last modified).

* cited by examiner

*Primary Examiner*—John Follansbee
*Assistant Examiner*—Lewis A. Bullock, Jr.
(74) *Attorney, Agent, or Firm*—Akin Gump Strauss Hauer & Feld LLP (57) ABSTRACT

A template for a logic synthesis command script is broken into smaller and functionally independent templates termed "micro-templates." Using micro-templates, logic synthesis time may be significantly reduced. Each micro-template may correspond to a particular synthesis operation and may be enabled or disabled. Where synthesis of a particular set of synthesis operations is desired, the micro-templates corresponding to those synthesis operations are enabled.

18 Claims, 6 Drawing Sheets

METHODOLOGY AND GRAPHICAL USER INTERFACE FOR BUILDING LOGIC SYNTHESIS COMMAND SCRIPTS USING MICRO-TEMPLATES

BACKGROUND OF THE INVENTION

1. Field of the Invention

The present invention relates to a micro-template graphical user interface (GUI) and methodology that enables the user of a script-oriented logic synthesis tool to break a template for a logic synthesis command script into smaller and functionally independent templates termed "micro-templates."

2. Description of the Related Art

With astonishing regularity over the past several decades, transistors have become smaller and the devices that employ them have become more complex. Today it is not uncommon for an integrated circuit (IC) to contain millions of transistors. The job of designing these ICs has also grown correspondingly more difficult. What was once accomplished by a single individual or a small group of individuals is typically performed by a large team or multiple teams of designers.

Although microprocessors and microcontrollers have become more difficult to design, a number of tools have been developed to make the job easier. One class of tools that makes the job more manageable is called electronic design automation (EDA). Using an EDA tool, a designer can break a large circuit into smaller functional units and specify constraints and requirements such as desired inputs and outputs of the functional units. The EDA tool then suggests solutions, often drawing on a vast digital library of possible circuits. In this manner, large circuits are decomposed into more manageable units that can be designed individually, perhaps by groups of designers working more or less independently. The result is that the overall design process is significantly faster than it would be otherwise.

A design framework may provide a graphical synthesis environment in which a designer can constrain and synthesize a design using a set of templates for creating logic synthesis command scripts. Information relevant to a specific design may be stored in template files and compiled into a design run as needed. The design framework may provide a mechanism for maintaining and sharing synthesis scripts and parameters. Also, the design framework may enable a user to create a gate-level netlist (a shorthand description of a schematic indicating connections among logic elements) including Design For Test (DFT) scan chains. For example, a synthesis page of a design framework may allow a user to configure synthesis constraints, compile high-level Register Transfer Level (RTL) code which takes into account the constraints, generate data for other teams of designers who place and route the design in light of the constraints, and generate schematics used for final circuit layout configuration. Certain design frameworks thus have given a user the ability to easily constrain and synthesize a design using a known set of synthesis templates.

Typically, EDA and DFT tools are command oriented, with the data required to set up and compile a design contained within a logic synthesis command script. A logic synthesis command script contains the commands necessary to run an EDA tool as well as the commands necessary to locate and read the required data files. Logic synthesis command scripts may be generated by use of logic synthesis templates. A logic synthesis template is a skeleton script that provides a form to follow in the generation of the command script, making the generation of the script easier.

Logic synthesis command scripts generate extremely long run times due to their complex nature. Typically, the command script initiates a compiler that processes both the data contained within the data files and information contained in design libraries to generate the output such as netlists, schematics and reports. When the data files increase in size, the necessary processing grows exponentially. As microprocessors, microcontrollers, and dedicated integrated circuits grow larger and more complex, the EDA tools and the compilers that design these circuits become more and more taxed to perform their tasks.

SUMMARY OF THE INVENTION

Briefly, a system according to the present invention employs a graphical user interface (GUI) to enable a synthesis user to build and run logic synthesis command scripts tailored to a task at hand. By means of the GUI, the synthesis user can concentrate on particular synthesis operations by enabling certain synthesis operations and disabling other synthesis operations. The particular synthesis operations are defined by use of "micro-templates." A template constructed from selected micro-templates may include desired synthesis fuctionality and exclude undesired synthesis functionality. By selectively limiting the synthesis operations that a compiler has to process, the compiler can work faster and more efficiently. Micro-templates thus bring a new degree of flexibility and proficiency to logic synthesis.

A disclosed GUI is a build script graphical user interface to selectively enable and disable micro-templates. The build script GUI includes a Create script option to build a logic synthesis command script corresponding to enabled micro-templates. In the past, to debug logic synthesis whether through manual or script-based commands, it was necessary to resynthesize for virtually all synthesis operations. The time to do so was prohibitive. In accordance with the present invention, by using the build script GUI to enable only the synthesis operations of debug interest, synthesis time may be significantly reduced.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENT

Figure 1:
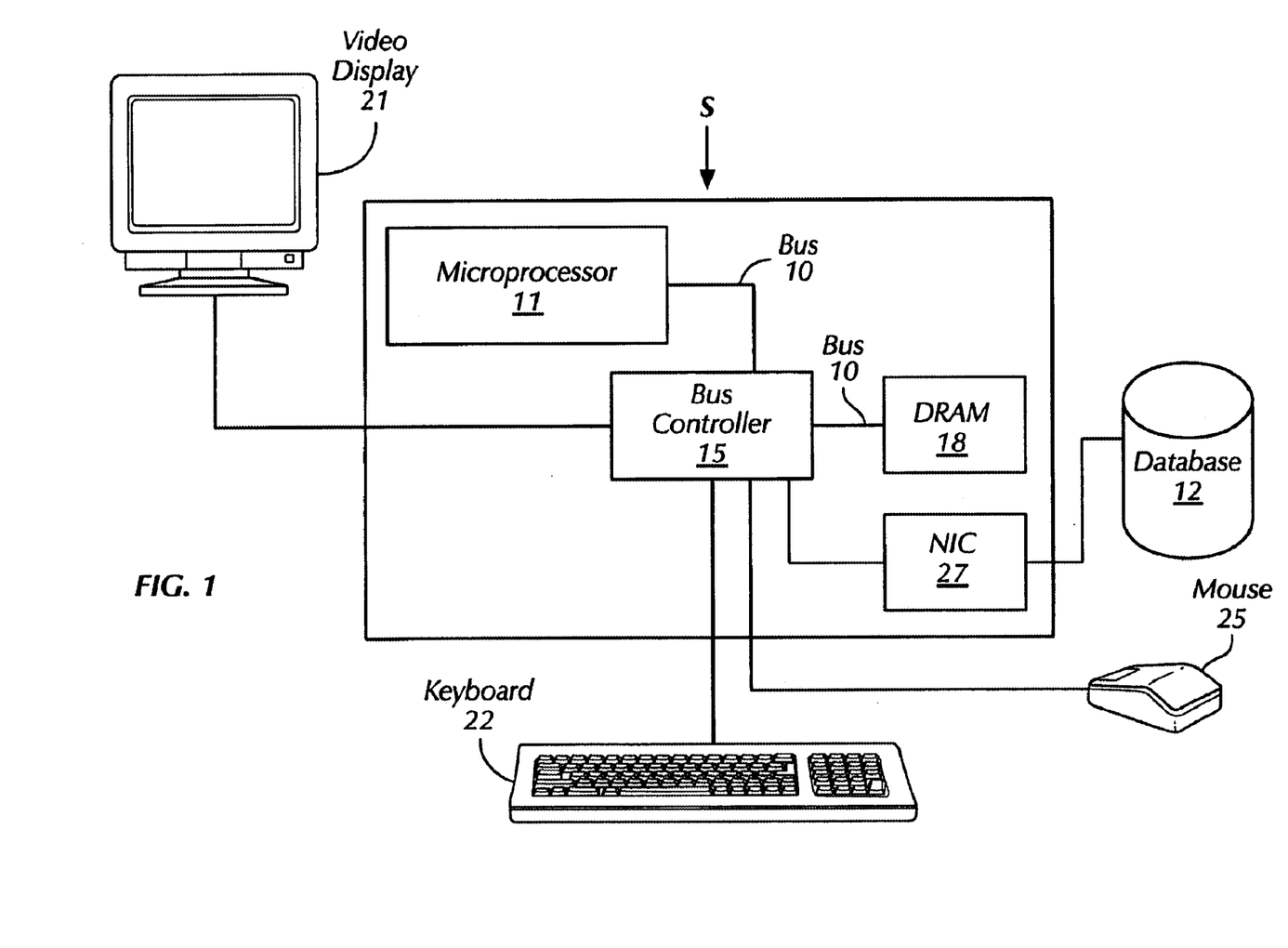
FIG. 1 is a block diagram of a computer system that may employ a graphical user interface (GUI) and methodology in accordance with the present invention.

Turning to FIG. 1, illustrated is a computer system S upon which a graphical user interface (GUI) according to the invention can be run. The computer system S is typically a UNIX-based workstation. The computer system S may be configured around an internal bus 10 connected to a microprocessor 11 and a bus controller 15. Also included within the illustrated computer system S and connected to the bus 10 is a dynamic random access memory (DRAM) or other form of system memory 18, and a network interface card (NIC) 27. The NIC 27 is shown coupled through a network to a database 12. Finally, a video display 21, a keyboard 22 and a mouse or other pointing device 25 are connected to the computer system S through circuitry in the bus controller 15, enabling human interaction with the computer system S.

The computer system S is used for illustrative purposes only. The type and nature of the processor 11, the memory 18, and other illustrated hardware components are not critical to the invention. It will be appreciated by those skilled in the art that a graphical user interface according to the invention may reside in a computer system on a network.

Figure 2:
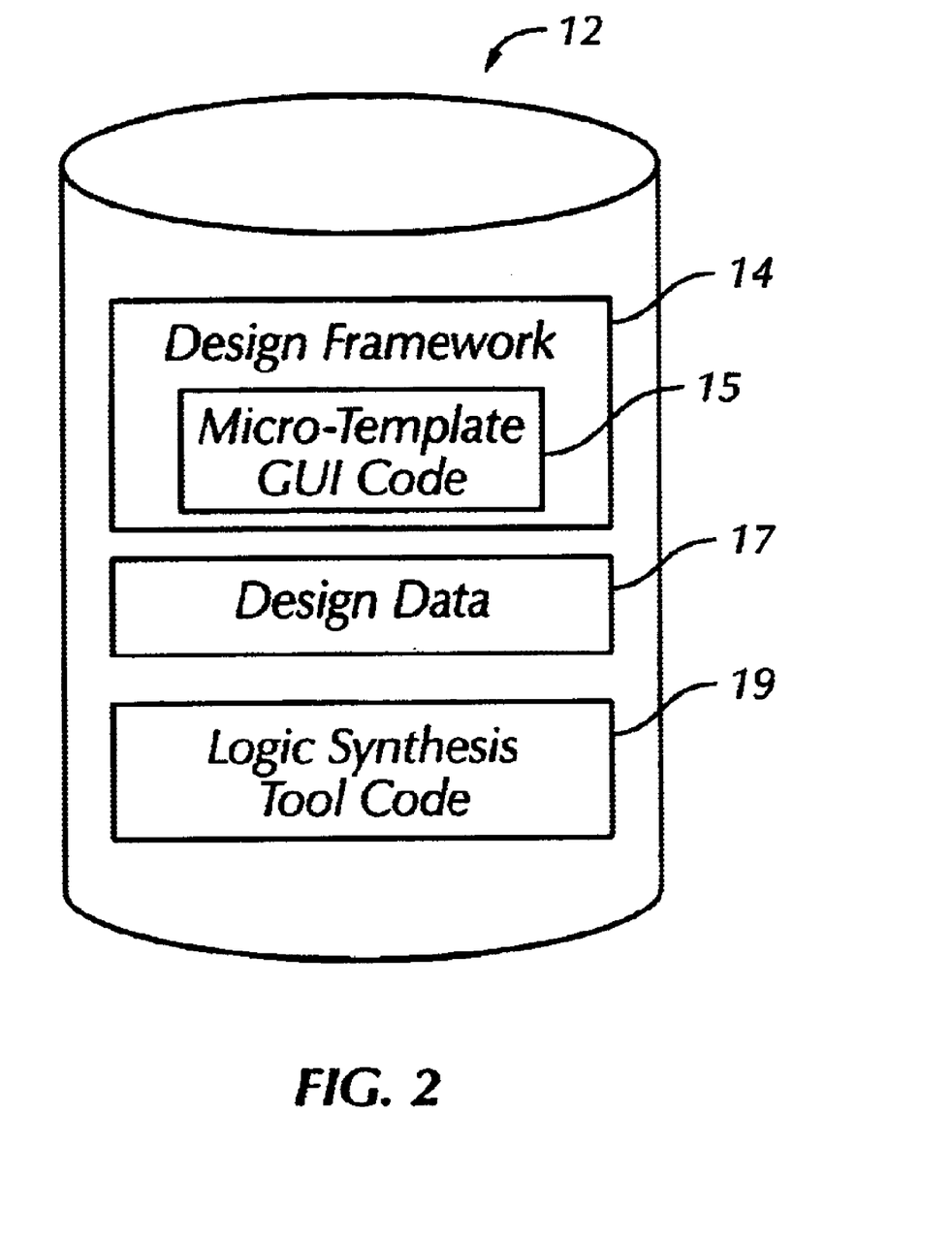
FIG. 2 is an illustration of the code contained in the database of FIG. 1 in accordance with the present invention.
Figure 3:
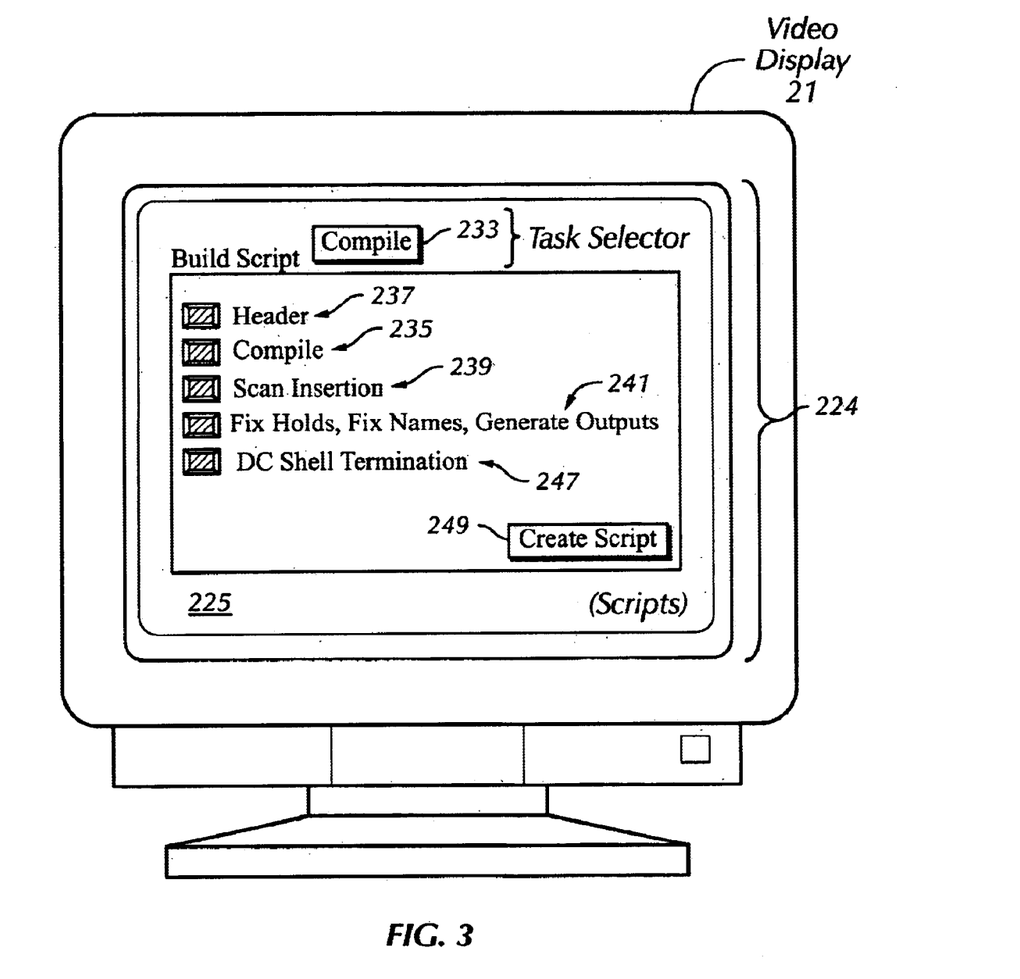
FIG. 3 is a video display showing an exemplary form of a graphical user interface (GUI) in accordance with the present invention.

Referring to FIG. 2, the database 12 stores a design framework or environment 14, design data 17, and logic synthesis tool code (e.g., a compiler) 19. The design framework 14 includes micro-template graphical user interface code 15. The micro-template GUI code 15 is responsible for generating and controlling a micro-template GUI 224 (FIG. 3). The design framework 14 is a software program which may run the logic synthesis tool 19. An example of a suitable design framework 14 is a Silicon Arena version available from Unified Design Automation, Inc. An example of a suitable logic synthesis tool 19 is the Design Compiler available from Synopsys.

Turning now to FIG. 3, illustrated is the video display 21 displaying an exemplary "Scripts" screen or page 225 for the micro-template graphical user interface (GUI) 224 in accordance with the present invention. The Scripts screen 225 is for use with the script-oriented logic synthesis tool 19.

Shown on the Scripts screen 225 is a Build Script graphical user interface in the form of an option menu 227. The Build Script option menu 227 provides a mechanism for building a logic synthesis command script using "micro-templates" as described below.

The Build Script option menu 227 illustrated includes micro-template option buttons labeled "Header" 237, "Compile" 235, "Scan Insertion" 239, "Fix Holds, Fix Names, Generate Outputs" 241, and "DC Shell Termination" 247. The illustrated micro-template option buttons 237, 235, 239, 241, and 247 of the Build Script option menu 227 represent exemplary synthesis operations for a compile task. It will be appreciated by those skilled in the art that various combinations of synthesis operations for a compile task are possible.

Each of the exemplary synthesis operations serves as a "micro-template". Micro-templates are essentially functionally independent templates that are smaller than standard templates. The Build Script option menu 227 basically enables a synthesis user to selectively enable and disable micro-templates. A synthesis user may click or select a micro-template option button to enable or disable a corresponding micro-template. The enabled micro-templates are utilized to generate a logic synthesis command script as described below. By using selected micro-templates as opposed to a single larger standard template, a logic synthesis command script may be tailored to a particular task at hand. In this way, certain synthesis operations that are not of debug interest are not synthesized.

Figure 4:
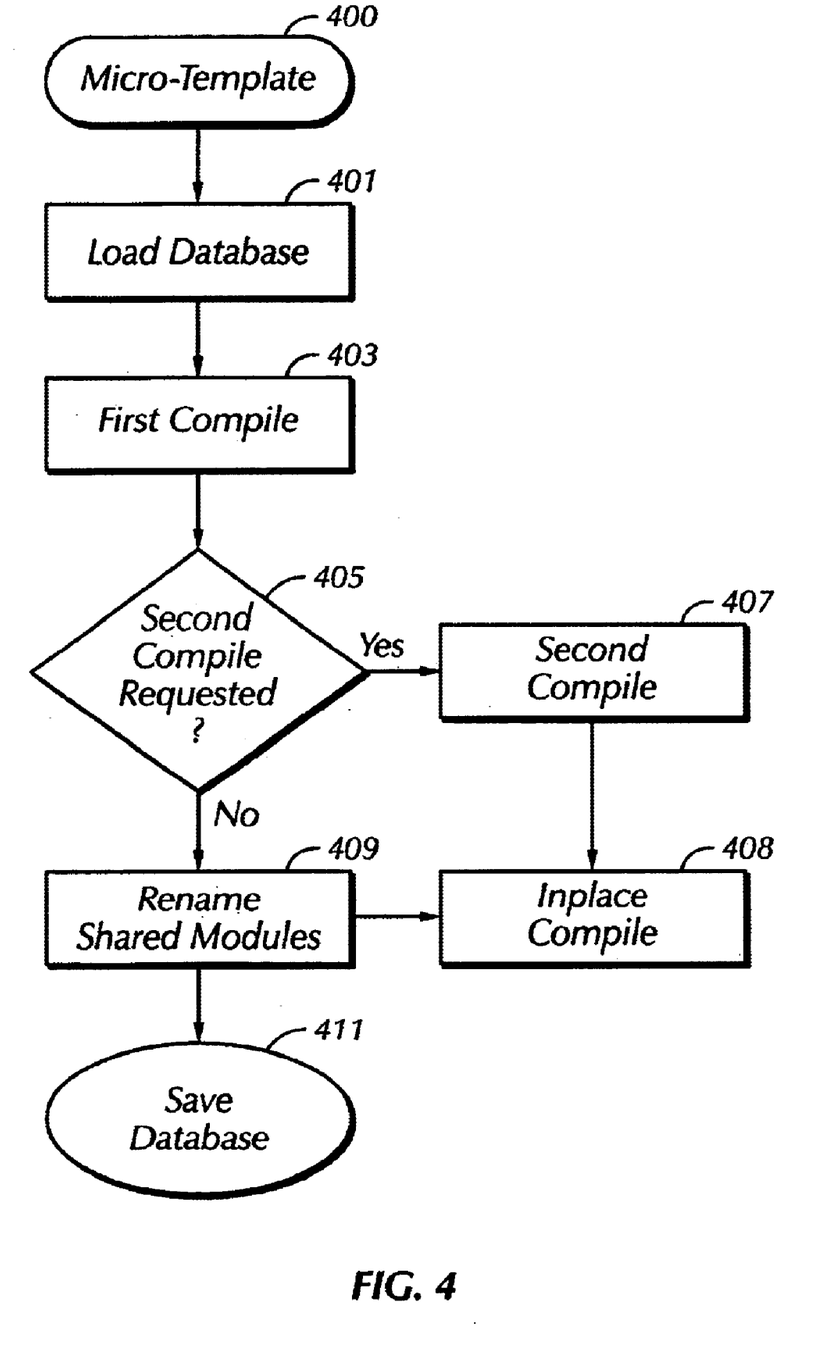
FIG. 4 is a flowchart of an exemplary micro-template associated with the compile micro-template option button of FIG. 3 in accordance with the present invention.
Figure 5:
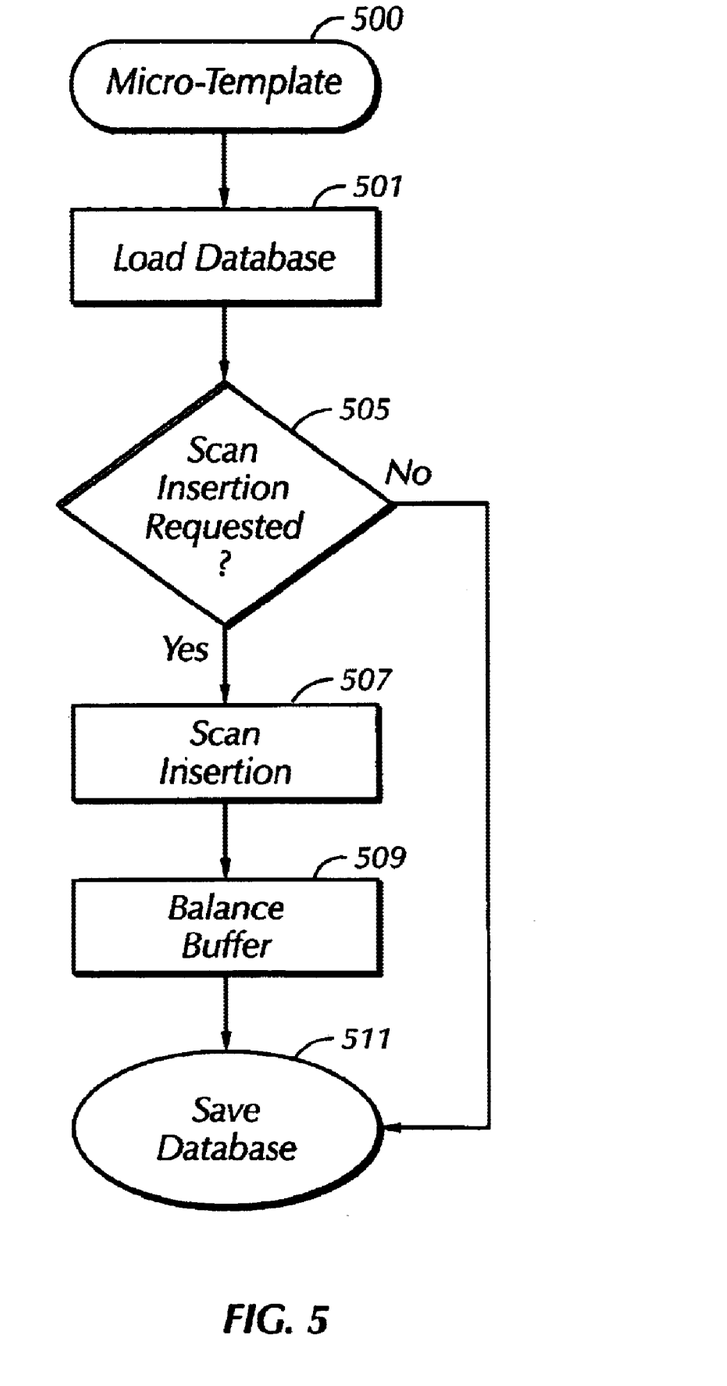
FIG. 5 is a flowchart of an exemplary micro-template associated with the scan insertion micro-template option button of FIG. 3 in accordance with the present invention.

While a task may be associated with multiple micro-templates, a micro-template itself may include a sequence of multiple synthesis steps. For example, FIG. 4 shows an exemplary micro-template 300 corresponding to the compile micro-template option button 235. As another example, FIG. 5 shows an exemplary micro-template corresponding to the scan insertion micro-template option button 239.

One advantage of a methodology and graphical user interface according to the invention is a greater degree of control over the logic synthesis process from start to finish. A user of such a methodology and graphical user interface may manipulate end synthesis operations without running intermediate synthesis operations or manipulate intermediate synthesis operations without running end synthesis operations. In accordance with the present invention, a design framework and script-oriented logic synthesis tool utilizing the disclosed methodology and graphical user interface may be highly configurable.

A Create Script option button 249 of the Build Script option menu 227 is used to initiate the generation of a logic synthesis command script based upon the particular micro-templates enabled. The Build Script option menu 227 may be packaged with or encapsulated in the design framework 14.

Turning now to FIG. 4, illustrated is a flowchart of a typical micro-template 400 which may be enabled or disabled in response to the selection of the Compile micro-template option button 235 (FIG. 3). Beginning in step 401, the appropriate data is loaded from the database 12. The micro-template 406 next in step 403 performs a first compile of the logic synthesis command script. In logic synthesis, a compile can take hours, or even days, depending upon the complexity and size of the particular design. If a compile is not necessary for debugging, then the compile micro-template 400 may be disabled. If a lengthy compile is not necessary for debugging, then a reduced compile micro-template may be enabled. If test features are needed during a compile, then a micro-template for a compile with test features may be enabled. It should be understood from these examples that micro-templates add a new degree of flexibility and proficiency to logic synthesis.

Proceeding to step 405, the micro-template 400 determines whether a second compile has been requested by the synthesis user. If the answer is "Yes," then the micro-template 400 proceeds to step 407 where a second compile is performed. If a synthesis user knows beforehand that a second compile is not necessary for debugging, then a micro-template for a single compile may be enabled. Next in step 408, an in place compile is performed. Control of the micro-template 400 then proceeds to step 409 where shared modules are renamed for consistency. If the synthesis user has chosen "No" to a second compile in step 405, then control proceeds directly from step 405 to step 409. The elimination of a second compile may save hours of run time for the logic synthesis command script. Finally, the micro-template 400 terminates processing in step 411 by saving the appropriate data to the database 12.

Turning now to FIG. 5, illustrated is a flowchart of a typical Scan Insertion micro-template 500 which may be enabled or disabled in response to the selection of the Scan Insertion micro-template option button 239 (FIG. 3). The Scan Insertion micro-template 500 begins processing in step 501 where the appropriate data is loaded from the database 12. Next, in step 505 it is determined whether a scan chain insertion has been requested. If the answer is "No," then the micro-template 500 finishes processing in step 511. If the answer is "Yes," then control is passed to step 507 where scan chain insertion processing is performed. Next, in step 509, a buffer is balanced. Finally, the micro-template 500 finishes processing in step 511 by saving the appropriate data to the database 12.

Figure 6:
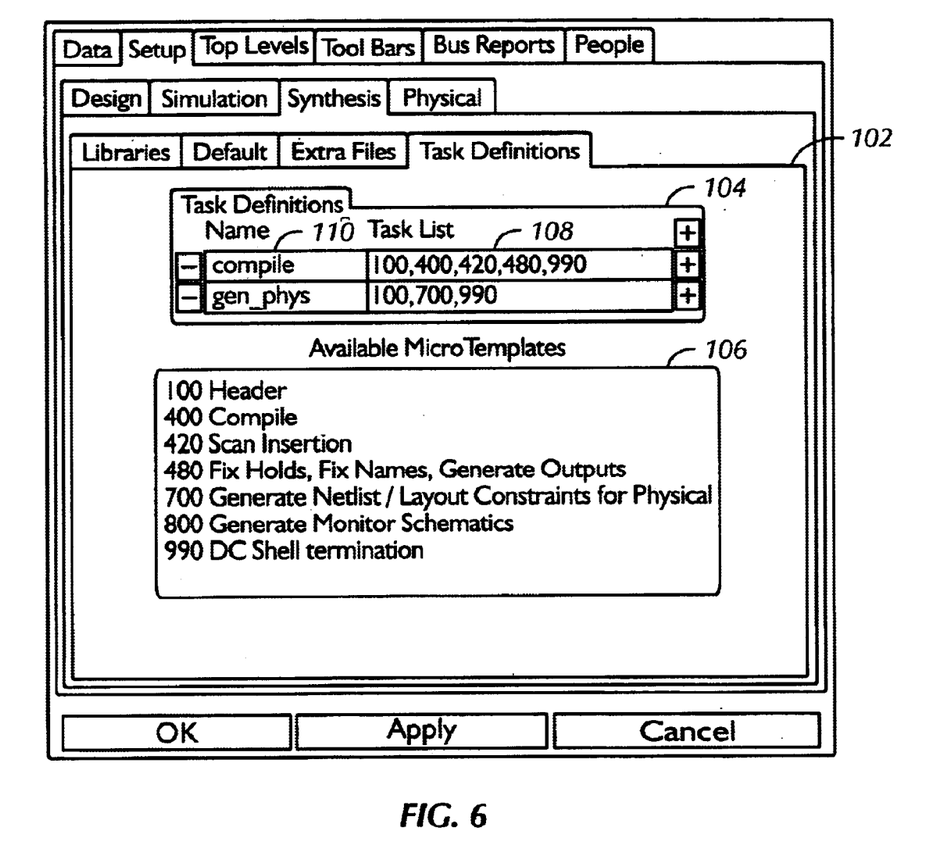
FIG. 6 is an illustration of a task definition setup screen for the graphical user interface of FIG. 3.

Turning now to FIG. 6, shown is a task definition setup screen or page 102 for the micro-template graphical user interface 224. This screen 102 allows a synthesis user to define a task as including a particular set of possible or available micro-templates. The screen 102 includes a Task Definitions field 104 and an Available Micro-templates field 106. The Task Definitions field 104 indicates the definitions for the particular tasks. A task list sub-field 108 of the Task Definitions field 104 provides the micro-template numbers corresponding to the micro-templates associated with the particular task. In the illustrated screen 102, a compile task is defined as associated with a 100_micro-template, a 400_micro-template, a 420_micro-template, a 480_micro-template, and a 990_micro-template. A task for generating physical netlists and layout constraints is defined as associated with the 100_micro-template, a 700_micro-template, and the 990_micro-template. A name sub-field 110 of the Task Definitions field 104 provides the names of the particular tasks. Each task name in the name sub-field 110 is aligned with the associated micro-template numbers in the task list sub-field 108.

A task generally falls into one of four basic task types: (i) logic synthesis (compile), (ii) generate physical netlists and layout constraints (gen-phys), (iii) generate schematic for verification, and (iv) apply back annotation to synthesized netlists and generate reports. Each task may be named and assigned a list of constituent task numbers. When a particular task is selected using a task selector 233 (FIG. 3), the available micro-template list corresponding to the task is automatically generated for the Build Script option menu 227. In FIG. 3, the task selector 233 reflects selection of a compile task.

The micro-templates in FIG. 3 represent an exemplary available micro-template list for a compile task. It should be understood that a methodology and graphical user interface according to the invention is applicable to any task.

The disclosed micro-templates are only exemplary and illustrative. Accordingly, it should be appreciated by those skilled in the art that numerous types of micro-templates and combinations of micro-templates are possible. Based on the disclosed graphical user interface and methodology, it should be understood that other ways for a synthesis user to tailor a logic synthesis command script to specific synthesis operations using micro-templates are possible without departing from the spirit of the invention. Further, it should be appreciated by those skilled in the art that a micro-template list for a task may partly be based on the nature of the particular logic synthesis tool and/or the particular design framework.

The foregoing disclosure and description of the preferred embodiment are illustrative and explanatory thereof, and various changes in the synthesis methodology, graphical user interface, variables, number of parameters, order of steps, field sizes, data types, code elements, code size, connections, components, and circuitry, as well as in the details of the illustrated hardware and software and construction and method of operation may be made without departing from the spirit of the invention.

I claim:

1. A micro-template graphical user interface (GUI) for building a logic synthesis command script using micro-templates, the GUI comprising:

a build graphical user interface (GUI) to selectively enable and disable a plurality of micro-templates; and a create script option of the build GUI to build a logic synthesis command script corresponding to the enabled micro-templates, wherein each of the plurality of micro-templates contains a skeleton logic synthesis script, and wherein the logic synthesis command script controls an electronic design automation tool for synthesizing a circuit design.

2. The GUI of claim 1, further comprising:

a task selector to select a task associated with the plurality of micro-templates.

3. The GUI of claim 1, the build GUI, comprising:

a plurality of micro-template options corresponding to the plurality of micro-templates to selectively enable and disable the plurality of micro-templates.

4. The GUI of claim 1, wherein the plurality of micro-templates correspond to a plurality of synthesis operations.

5. The GUI of claim 1, further comprising:

a task definition setup screen to define a task corresponding to the plurality of micro-templates.

6. The GUI of claim 1, wherein the build GUI is presented through a web browser.

7. The GUI of claim 1, wherein the build GUI is encapsulated in a design framework.

8. A computer system adapted for building a logic synthesis command script using micro-templates, comprising:

a display;

a processor coupled to the display;

computer readable media accessible by the processor;

a design framework on the computer readable media executable by the processor, the design framework when executed providing a micro-template graphical user interface (GUI) on the display for building a logic synthesis command script using a plurality of micro-templates, the micro-template graphical user interface comprising:

a build script graphical user interface (GUI) to selectively enable and disable the plurality of micro-templates; and a create script option of the build GUI to build a logic synthesis command script corresponding to enabled micro-templates, wherein each of the plurality of micro-templates contains a skeleton logic synthesis script, and wherein the logic synthesis command script controls an electronic design automation tool for synthesizing a circuit design.

9. The computer system of claim 8, wherein the GUI further comprises:

a task selector to select a task associated with the plurality of micro-templates.

10. The computer system of claim 8, wherein the build GUI comprises:

a plurality of micro-template options corresponding to the plurality of micro-templates to selectively enable and disable the plurality of micro-templates.

11. The computer system of claim 8, wherein the plurality of micro-templates correspond to a plurality of synthesis operations.

12. The computer system of claim 8, wherein the GUI further comprises:

a task definition setup screen to define a task corresponding to the plurality of micro-templates.

13. A method of building a logic synthesis command script using micro-templates, comprising the steps of:

selectively enabling a first set of micro-templates from a plurality of micro-templates;

selectively disabling a second set of micro-templates of the plurality of micro-templates; and building a logic synthesis command script corresponding to the first set of micro-templates, wherein each of the plurality of micro-templates contains a skeleton logic synthesis script, and wherein the logic synthesis command script controls an electronic design automation tool for synthesizing a circuit design.

14. The method of claim 13, wherein only the first set of micro-templates from the plurality of micro-templates are currently of debug interest.

15. The method of claim 13, wherein the plurality of micro-templates correspond to a plurality of synthesis operations.

16. The method of claim 13, further comprising the step of:

performing logic synthesis based on the logic synthesis command script.

17. The method of claim 13, farther comprising the step of:

defining a task associated with a plurality of micro-templates.

18. The method of claim 13, further comprising the step of:

selecting a task associated with a plurality of micro-templates.

* * * * *